April 30, 1957 F. C. HUYSER 2,790,321
PORTABLE HARDNESS TESTER
Filed Dec. 29, 1953 2 Sheets-Sheet 1

INVENTOR.
FRANCIS C. HUYSER
BY
Bruno C. Lechler
ATTORNEY

INVENTOR.
FRANCIS C. HUYSER
BY
ATTORNEY

United States Patent Office 2,790,321
Patented Apr. 30, 1957

2,790,321

PORTABLE HARDNESS TESTER

Francis C. Huyser, Moline, Ill., assignor to American Machine and Metals, Inc., New York, N. Y., a corporation of Delaware Application December 29, 1953, Serial No. 400,836

3 Claims. (Cl. 73—83)

This invention relates to hardness testers and more particularly to a portable hardness tester which the operator may hold in his hand while making a hardness test and by means of which the hardness not only of laboratory specimens but also of actual objects, such as portions of structures or machinery, can be tested which cannot be conveniently carried to the usual bench-type laboratory hardness tester.

This application is a continuation in part application of my co-pending application S. N. 106,591, filed July 25, 1949, and also entitled Portable Hardness Tester, now abandoned.

The present invention further relates generally to a portable hardness tester of the general type shown in the Focke-Wulf etc., German Patent No. 618,608, dated September 12, 1935. This patent discloses a portable hardness tester wherein the loading bar, which takes the form of a cantilever type spring, is supported upon screws carried by the lower jaw of a clamping device. It has been found that such structure renders the test sensitive to stresses in both the upper and lower clamping devices. In addition to this, it has been found that temperature coefficients of expansion, and temperature coefficients of variable stress may operate in variable degrees in such type structure because of the number of parts which contribute to the mounting means for the loading spring or bar, and because of variable jaw openings of the clamping devices.

Accordingly, it is a broad object of the present invention to provide a portable hardness tester wherein the measuring elements are substantially isolated from the stress and temperature effects upon at least one of the clamping bars.

A further broad object of the invention is to provide a structure with the elements arranged to produce a more rugged and compact device than that taught in prior art devices.

It is another object of the invention to provide a portable hardness tester wherein the entire hardness testing mechanism is mounted on one jaw of a clamp which holds the object to be tested independently of the indenter used for producing an indentation in the object to be tested.

It is a further object of the invention to provide a portable hardness tester wherein the entire mechanism for applying the test load to the indenter and for measuring this load and, if desired, also for measuring the depth of the penetration of the indenter into the object to be tested while said indenter is subjected to said test load, is carried on one jaw of a clamp so that the result of a test carried out with such a hardness tester will not be affected by any stresses in, or distortions of, the elements of the clamp.

Another object of the invention is to provide a portable hardness tester wherein on one of the two jaws of the clamp just mentioned a bar is pivoted whose one end carries the indenter and whose other end extends into the path of a loading member capable of subjecting the bar to elastic distortion while the indenter penetrates the object to be tested.

A further object of the invention is to provide a portable hardness tester wherein displacement of two prongs of a U-shaped or tuning-fork-like unit can be used as a measure of the applied load.

A further object of the invention is a portable hardness tester of the kind referred to wherein the test load applied to the one of the two prongs of the tuning-fork-like unit is measured by an indicating device carried by the other prong and registering the changes occurring in the distance between the two prongs due to elastic distortion of that prong to which the test load is applied.

A further object of the invention is to provide a portable hardness tester in which the prong which carries the just mentioned device for measuring changes in the distance between the two prongs also carries means for indicating the depth of the penetration of the indenter into the object to be tested.

Another object of the invention is to provide a portable hardness tester wherein the one of the two jaws of the clamp which carries the hardness testing mechanism has a slot through which the indenter extends and, while located within that slot, may be moved relative to said clamp jaw.

A further object of the invention is to provide a portable hardness tester wherein the loading bar is arranged to have a mechanical advantage with respect to the load applying means and the penetrator means, and in which said bar is in the critical spring section a simple geometrical shape to thereby render more accurate the taking of a given hardness.

Still another object of the invention is to provide a portable hardness tester capable of testing the hardness of objects which have overhanging parts and of entering small spaces in spite of a plurality of indicating devices being mounted on one of the two prongs of the above mentioned tuning-fork-like unit.

Other objects of the invention will appear as the description proceeds, reference being had to the accompanying drawings, in which.

Figure 1:
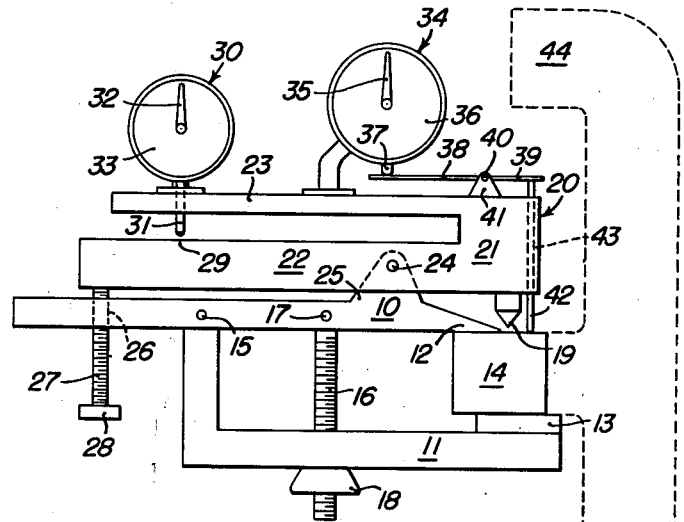
Fig. 1 is a side elevation of a hardness tester according to the invention, the components of the apparatus being shown in a diagrammatic form and manner only to illustrate the principle of the invention.

Referring first to the diagrammatic illustration of Fig. 1, 10 and 11 denote the two jaws of a clamp adapted to hold between their ends 12 and 13 the object to be tested or specimen 14. The two jaws or jaw arms 10, 11 are so connected with each other that the distance between the jaw ends 12 and 13 can be varied to accommodate specimens 14 of different heights. According to Fig. 1 this is achieved by having the lower jaw 11 linked to the upper jaw 10 at 15 and by the provision of a threaded bolt 16 which is pivoted to the upper jaw 10 at 17 and passes through a slot (not shown) in the lower jaw 11. The bolt 16 carries a wing nut 18 by means of which the distance of the end 13 of the lower jaw from the end 12 of the upper jaw 10 may be varied to fit the height of the particular object 14 desired to be clamped between the two clamp jaws.

The end 12 of the upper jaw 10 is shaped so as to permit an indenter 19 to reach the specimen 14 held clamped between the jaws 10 and 11. The indenter may be of any one of the types conventional in hardness testing apparatus, such as of the type used in hardness testing systems known as the Brinell system or the type used in the system known as the Rockwell system. Mounted on one of the two jaws 10, 11, in the example shown on the upper jaw 10, is all the apparatus for applying the test load to the indenter 19 as well as for indicating or measuring the load applied to the indenter and preferably also the depth of penetration of the indenter into the specimen under such load.

An important part of the apparatus carried by the jaw 10 is a U-shaped unit generally denoted as 20 which comprises a base portion 21 carrying the indenter 19 and two horizontally extending bars 22 and 23. The bar 22 to which, in a manner to be described, the test load is applied for loading the indenter 19 and which is constructed so as to be slightly flexible will be hereinafter referred to as "load bar" whereas the bar 23, for reasons which will be apparent when the mode of operation of the unit 20 will have been described, is called "reference bar." The unit 20 resembles essentially a tuning fork having the two bars 22 and 23 as its prongs. The load bar 22 is pivoted at 24 on an extension 25 of the upper jaw 10 of the clamp 10, 11. Passing through a threaded hole 26 of the jaw 10 near the rear end thereof is a loading member in the form of a threaded bolt 27. The bolt 27 carries at its one end a knob 28 and extends at its other end through the threaded hole 26 in the jaw 10 so as to bear against the rear end of the load bar 22. When the knob 28 is turned so as to move the bolt 27 upwardly, the rear end of the load bar 22 is forced upwardly and as long as the indenter 19 is not in engagement with the specimen 14 the entire unit 20 will be turned in clockwise direction about the pivot 24. Such free turning of the unit 20 is possible only until the tip of the indenter 19 comes to bear against the upper surface of the specimen. From this moment on the movement of the unit 20 is restrained and further application of load to the load bar by the screw 27 causes the part of the load bar 22 extending from the pivot 24 to the left to deflect about that pivot 24. That part of the load bar 22, however, which extends to the right from the pivot 24 can perform no greater movement than determined by the penetration of the indenter 19 below the upper surface of the specimen 14. Application of load by means of the loading member 27 to the left hand end of the lower prong or load bar 22 of the tuning-fork-like unit 20 while the indenter 19 is in engagement with the specimen 14 leads, therefore, to an elastic distortion of said load bar 22 without causing distortion of the upper prong 23. Thus, while the bar 22 in unloaded condition is parallel to the reference bar 23, this parallelism becomes disturbed when the free movement of the unit 20 is resisted by the counter pressure of the specimen 14 against the indentor 19 and the left hand side of the load bar 22 then responds to the action of the loading member 27 by becoming flexed relative to the undistorted reference bar 23. It will be obvious that the distance of the free end of the load bar 22, or of point 29 thereof, from the reference bar 23 decreases the higher the test load that is imposed upon the load bar 22 by the loading member 27.

Placed in the path of the load bar 22 at the position of the point 29 thereof is a feeler 31 which passes through a hole in the reference bar 23 and forms part of an indicating device generally denoted as 30 and carried by the reference bar 23. The feeler 31 is free to move vertically and such vertical movement causes in well known manner a pointer 32 to rotate over a dial 33 of the indicator 30. The vertical movement of the feeler 31 being caused by the distortion of the load bar 22, the pointer 32 indicates on the dial 33 the amount of said distortion or some mathematical function thereof. Properly calibrated, the pointer 32 will indicate on the dial 33 the load applied by the screw 27 to the load bar 22 and through that load bar to the indenter 19.

Assuming that the indenter 19 is of the Brinell type having as the indenting element proper a ball, and that the hardness of the specimen is to be measured in the manner customary when using a Brinell ball, i. e., by measuring with a microscope the diameter of the circular edge of the impression left by the ball, then no other mechanism than the one described thus far is necessary.

To carry out hardness measurements according to the Rockwell system in which a pointed cone is used as indenter and the depth of the hole created in the specimen by this point is measured, a second indicator 34 adapted to indicate said depth or a function of that depth has to be used in addition to the above described indicator 30. Like the indicator 30, the indicator 34 is mounted on the reference bar 23. 35 denotes the pointer, 36 the dial, and 37 the feeler of the indicating instrument 34. The feeler 37 which operates the pointer 35 is vertically movable under the action of an arm 38 of a two-armed lever 38, 39 pivoted at 40 on a support 41 which is attached to the reference bar 23. The other arm 39 of the two armed lever 38, 39 cooperates with a pin 42 extending freely through a vertical hole 43 in the base portion 21 of the U-shaped unit 20 and resting on the upper surface of the specimen 14. When no greater load is applied to the load bar 22 by means of the screw 27 than is necessary to bring the indenter 19 into contact with the surface of the specimen 14, the indenter 19 and the pin 42 are in a relative position of height to each other which may be called the initial position. Upon further operation of the screw 27 so as to deform the load bar 22 and force the tip of the indenter 19 below the surface of the specimen 14, the pin 42 will move upwardly relative to the indenter 19 and the pivot 40. Thereby, the lever 38, 39 is turned about said pivot 40 and moves the feeler 37 to rotate the pointer 35 over the dial 36, which may be calibrated in inches of penetration, or so as to indicate directly Rockwell hardness numbers. More will be said about the dials 33 and 36 of the indicating devices 30 and 34 farther below as part of the description of the apparatus shown in Figs. 2 to 4.

The two arms 38, 39 of the double armed lever 38, 39 may be of unequal length and preferably the arm 38 cooperating with the feeler 37 is of greater length than the arm 39 cooperating with the pin 42 so that the feeler 37 carries out a much greater movement than the pin 42. This relatively large movement of the feeler 37 may then be further magnified by a suitable gear mechanism (not shown) between the feeler 37 and the pointer 35.

While the indicator 30 is placed near the free end of the reference bar 23 and thereby far away from the axis of the indenter 19 which, in turn, is arranged rather close to the pivot 24, it is advantageous to place also the indicator 34 at a substantial distance back to the left of the axis of the indenter 19 so that neither of the two indicators 30, 34 will interfere with the object desired to be tested even if this object has overhanging parts, such as the part 44 indicated in Fig. 1 by dotted lines, and the space to be entered by the apparatus is small.

Figure 2:
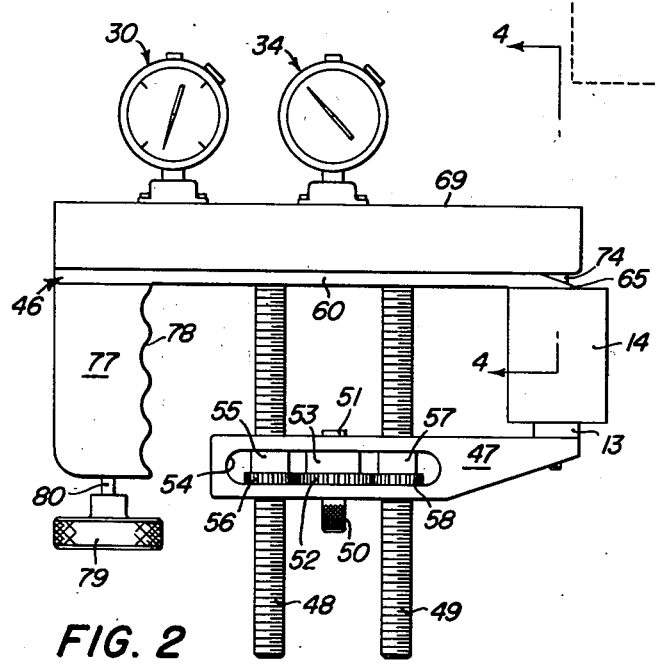
Fig. 2 is a side elevation of an actual practical embodiment of the invention.
Figure 4:
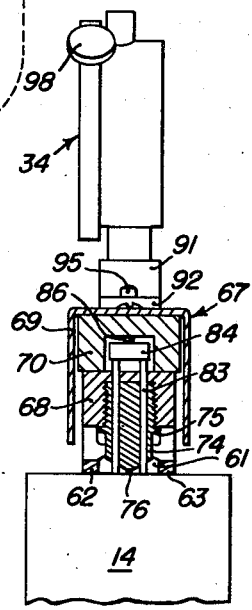
Fig. 4 is a vertical section along the lines 4—4 in Fig. 2 but drawn at the same scale as Fig. 3.
Figure 3:
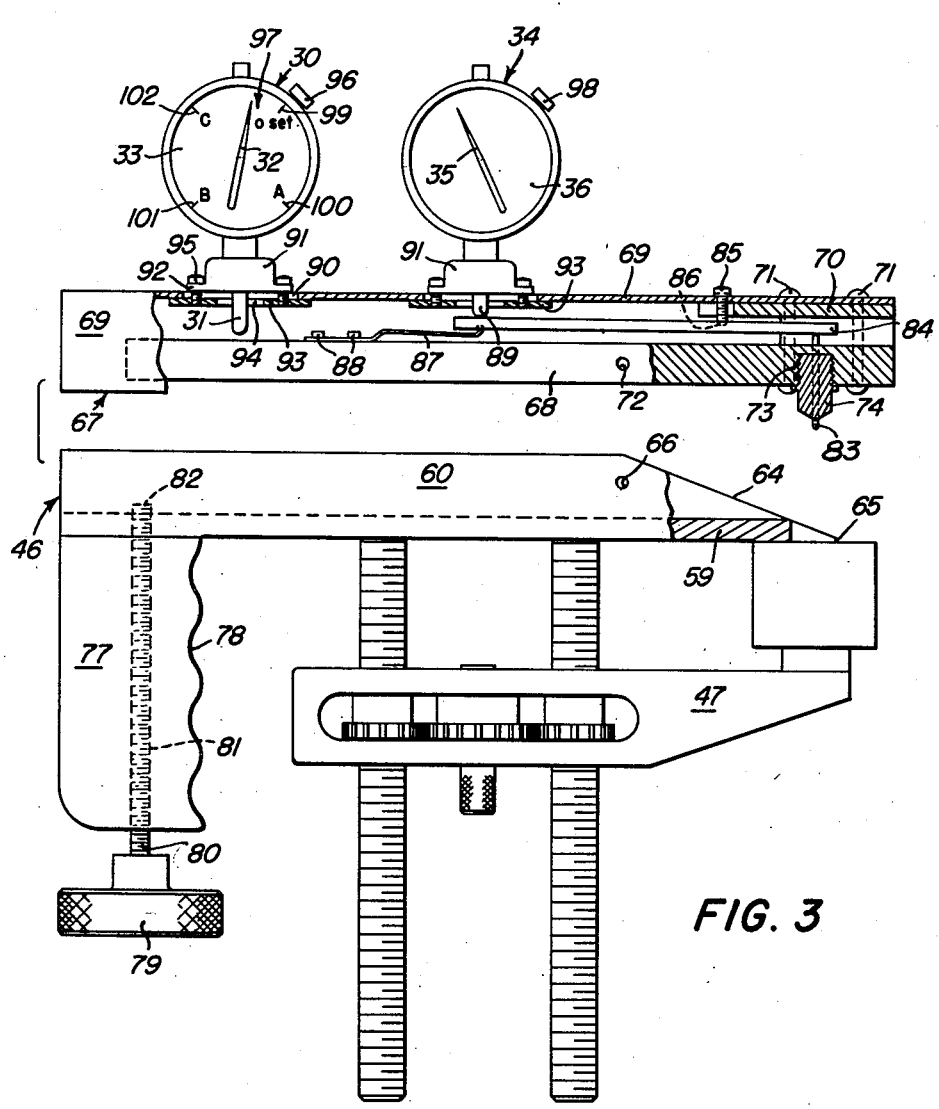
Fig. 3 is a partly exploded side elevation, at a larger scale and with some of the parts in section, of the apparatus shown in Fig. 2.

Turning now to the preferred embodiment shown in Figs. 2, 3 and 4, it will be seen that the hinge clamp 10, 11 of Fig. 1 is replaced here by a clamp whose two jaws 46 and 47 move in parallel to each other. The upper jaw 46 carries for that purpose two studs 48 and 49 along which the lower jaw 47 can be moved by operating a knurled knob 50 carried by a shaft 51 which passes through the jaw 47. Keyed to the shaft 51 is a pinion 52 formed on a hub 53 whose height is such as to take up the height of an elongated slot 54 in the jaw 47. On the stud 48 and within the slot 54 there is mounted a nut 55 carrying a gear 56. A similar nut 57 carrying a gear 58 is mounted on the stud 49 within the slot 54. The two gears 56 and 58 mesh with the pinion 52 so that by turning the shaft 51 by means of the knob 50, the pinion 52 rotates both gears 56 and 58 by equal amounts and the jaw 47 is moved parallelly to itself and to the upper jaw 46.

The upper jaw 46 comprises a bottom plate 59 and two upstanding sides 60. The bottom plate 59 has at its right end a slot 61, whereby this bottom plate terminates in two fingers 62 and 63 which, when the specimen 14 is clamped between the two jaws 46, 47, rest on that specimen. The upstanding sides 60 are at their right end cut away as shown at 64 so that an edge 65 is formed.

Supported by the two sides 60 of the jaw 46 is a pin 66 serving as a pivot for a unit generally denoted as 67 which corresponds to the tuning-fork-like unit 20 of Fig. 1 and again comprises a load bar, in Figs. 3 and 4 indicated by the numeral 68, a reference bar 69, and a base portion 70. The base portion 70 is channel-shaped and serves as a spacer between the load bar 68 and the reference bar 69 at the right hand end thereof. The three parts 68, 69 and 70 are rigidly united by rivets 71.

The load bar 68 has a horizontal hole 72 through which the pivot pin 66 supported in the sides 60 of the upper clamp jaw 46 passes. It is to be noted that the hole 72 is closer to indenter 74 than it is to the end 82 of load screw 80 by a factor of more than two to one. Such arrangement provides more accurate measuring as will be clear from the description below.

A vertical hole 73 is provided in the bottom of the load bar 68 to receive the circular shank of the indenter 74 having a flange 75 which bears against the underside of the load bar 68. The tip 76 of the indenter 74, while shown in the drawing as of conical shape, may be of other shape depending on the measuring system to be used and/or on the kind of material to be tested. The position of the indenter 74 on the load bar 68 is such that when the indenter is lowered for engagement with the specimen 14 the indenter extends into the slot 61 of the jaw 46 between the fingers 62, 63 which hold the specimen from above.

The upper jaw 46 of the clamp 46, 47 is provided with a handle 77 extending substantially perpendicularly to the bottom plate 59 of the jaw 46. For better convenience the handle 77 may be provided with finger recesses 78. By means of this handle 77 the entire hardness tester may be held in the left hand of the operator while his right hand is free to manipulate either the knob 50 for closing or opening the clamp 46, 47 or to operate a knurled knob 79 carried by a screw bolt 80 which passes through a threaded vertical passage 81 extending entirely through the handle 77. The upper end 82 of the screw bolt 80 extends beyond the upper end of the handle 77 and through the bottom plate 59 of the jaw 46. By turning the knurled knob 79 the upper end 82 of the screw 80 may be forced against the underside of the load bar 68.

Near the free end of the reference bar 69 there is attached thereto the indicator 30, which for some hardness testing methods, particularly the Brinell method, may be used alone, and for other methods, particularly the Rockwell method, is to be used in cooperation with a second indicator 34. The indicator 30 is mounted on the reference bar 69 which may be built, as seen best in Fig. 4, as a channel to secure lightness combined with rigidity. The upper side of this channel bar 69 has an elongated slot 90 which, when the indicator 30 is in place on the reference bar 69, is covered up by a flange 92 of a base 91 of the indicator 30. A clamping plate 93 which has a hole 94 for the passage of the feeler pin 31 may be drawn against the underside of the horizontal part of the channel-shaped reference bar 69 by means of screws 95. By loosening the screws 95 and sliding the base 91, 92 towards or away from the pivot 66, 72, the amount of movement of the pointer 32 on the dial 33 can be increased or decreased. The dial 33, over which the pointer 32 plays when driven by the feeler 31, is preferably rotatably mounted so that certain marks on that dial may be set into alignment with the pointer 32 whereupon the dial may be fixed by means of a setscrew 96 in the selected position, e. g., in the position in which the zero point of the dial, indicated in Fig. 3 at 97, is in alignment with the top of the pointer 32 after the hardness tester has been clamped to an object to be tested and the indenter has taken bearing on that object.

To measure the penetration of the indenter tip 76 and to correct for inequalities of the surface, two parallel holes extend through the indenter assembly 74 and through the load bar 68 as shown in Fig. 4. Two pins 83, one in each of said holes, bear against the specimen at their lower end and against a horizontal lever 84 at their upper end. This lever 84 is fulcrumed on the reference bar 69, such as by means of a screw 85 against whose pointed end 86 the lever 84 bears. A light spring 87 attached at 88 to the load bar 68 tends to lift the underside of the lever 84 at the left hand end in Fig. 3 until the right hand end of the lever 84 bears against the two pins 83. Situated above the left hand end of the lever 84 is a feeler pin 89 which forms part of the penetration indicator 34 whose pointer 35 plays over the dial 36 in consequence of movements of the lever 84. A similar adjustability as has been described for the dial 33 of the indicator 30 may be provided for the dial 36 of the indicator 34, a set screw 98 being provided for fixing the dial 36 in any selected position. Also the distance of the feeler pin 89 from the pivot 66, 72 may be adjustable by similar means as have been described for the feeler 31 of the indicator 30, the parts by means of which the indicator is adjustably attached to the reference bar 69 being indicated in Figs. 2 and 3 by the same reference numerals as are used for the corresponding parts belonging to the indicator 30.

To carry out a hardness test with the apparatus shown in Figs. 2 to 4, the two clamp jaws 46, 47 are first opened sufficiently by means of the knob 50 to permit their clamping ends 63 and 13 to pass over the specimen 14 to be tested and then, by turning the knob 50 in the opposite direction, the jaws are drawn together to engage the specimen 14. Now, the operator, who holds the apparatus in his left hand by the handle 77, turns the knob 79 to move the screw 80 towards the load bar 68. When the end 82 of the screw 80 has come into engagement with the underside of the load bar 68 continued turning of the knob 79 will cause the load bar 68, and with it the entire unit 67, to swing about the pivot 66, 72 in clockwise direction until the tip 76 of the indenter 74 will bear against the specimen 14. The dial 33 of the indicator 30 is now rotated until its zero mark 97 coincides with the pointer 32 whereupon the set screw 96 is tightened to lock the dial 33 in the adjusted position. A predetermined relatively small load, corresponding to a travel of the pointer 33 from the zero mark 97 to a mark 99 entitled "set," is now applied to the load bar 68 by further advancing the screw 80 by means of the knob 79. This "preloading" of the load bar 68 causes the left hand end of the load bar to spring lightly and the indenter 74 at the other end of the load bar to take a firm bearing on the specimen. The operator continues to turn the knob 79 in order to place a high test load on the load bar and continues to do so until the pointer 32 has advanced to another mark on the dial 33 which other mark may be one of the points 100, 101, or 102 shown in Fig. 3, each of these points corresponding to a different predetermined test load.

Assuming that the tip 76 of the indenter 74 is a Brinell ball and the test is to be made according to the Brinell system then the apparatus can be removed from the specimen and the hardness of the latter be determined by measuring the diameter of the indentation in the specimen with a microscope. With the aid of the usual table, the hardness can be found which corresponds to the diameter measured.

It will be thus noted that for carrying out a test according to the Brinell system, the second indicator 34 and the actuating means 83, 84 therefor are not needed. The presence of the second indicator makes, however, the apparatus suitable also for carrying out hardness tests according to other hardness testing methods than the Brinell method, in particular according to the Rockwell method. As has been mentioned before, for the Rockwell method the tip 76 of the indenter 74 is in the form of a conical point. The depth of penetration when the test load is applied to the tip 76 is indicated on dial 36. Since it is customary in the Rockwell system to use several scales A, B and C, depending upon the pre-load used, the dial 36 may have three concentric scales not shown on the drawing and the indication of the pointer 35 may be read on which ever scale corresponds to the test load indicated by the pointer of the other indicator 30. The points 100, 101 and 102 of the dial 33 of the indicator 30 correspond to these different test loads.

In making a Rockwell test the initial steps of pre-loading the load bar 68 until the pointer 32 has moved on the dial 33 from the zero position to the position "Set" and then of loading the load bar until it has been distorted enough to bring the pointer 32 to one of the positions "A," "B," or "C" on the dial 33 are carried out in the same manner as has been described above for a Brinell test. While the point 76 of the indenter 74 loaded by the load bar 68 is penetrating below the surface of the specimen 14, the pins 83 remain riding on this surface and, consequently, slide upwardly in their holes relative to the indenter 74 as well as the lever 84 and the reference bar 69, or in other words, relative to the tuning-fork-like unit 67. As the fulcrum 86 about which the lever 84 is turnable is rigidly connected with the reference bar 69, the movement of the pins 83 relative to the unit 67 causes a swing of the lever 84 about its fulcrum through an angle which is proportional to the depth of the penetration of the indenter into the specimen. This swing of the lever 84 is transferred via the feeler pin 89 to the pointer 35 of the indicator 34.

Depending on the calibration of the dial 36, the hardness of the specimen can either be read directly from the appropriate scale of the dial 36 or from a table giving the hardness as a function of the scale readings. Before making the readings on the dial 36, the screw 80 has to be loosened by means of the knob 79 until the pointer 32 of the indicator 30 again reads "Set" (point 99). It is only when this condition is reached, that the pointer 35 of the indicator 34 indicates on the dial 36 the proper hardness.

While in the drawings there are illustrated two particular embodiments of the invention, it is to be understood that these embodiments have been given by way of example only since various changes, modifications and rearrangements of the parts shown may be made without departing from the spirit of the invention or the scope of the appended claims.

I claim:

1. In a portable hardness tester, in combination, two jaws movable parallel to each other for clamping therebetween an object whose hardness is to be tested, a handle attached to one of said jaws and extending substantially perpendicular thereto, a generally U-shaped unit pivotally mounted directly on one of said jaws comprising a flexible load bar, a reference bar and a spacing member connecting said two bars at one end, the other end of said two bars being free, an indenter carried by said load bar near the connected end thereof, means extending through said handle for applying load to the free end of said load bar to distort the same relative to said reference bar without distortion of the latter, and means for determining the load applied to the indenter by measuring the deflection of a point of said load bar relative to the reference bar.

2. In a portable hardness tester, in combination, two jaws movable parallel to each other for clamping therebetween an object whose hardness is to be tested, one of said jaws having a slot, a handle attached to said slotted jaw and extending substantially perpendicular thereto, a generally U-shaped unit pivotally mounted directly on one of said jaws and comprising a flexible load bar, a reference bar and a spacing member connecting said two bars at one end, the other end of each of said two bars being free, an indenter carried by said load bar near the connected end thereof so as to extend through said slot for bearing on said object to be tested when the latter is clamped between said jaws, a rotatable screw means having a knob at one end and extending lengthwise through said handle so as to bear, when operated by said knob, upon said load bar and move the free end thereof relative to the free end of said reference bar while said indenter bears against said object to be tested, and means for determining the load applied to the indenter by measuring the deflection of a point of said load bar relative to the reference bar.

3. In a portable hardness tester, in combination, an indenter, two jaws movable relative to each other for clamping therebetween independently of said indenter an object whose hardness is to be tested, a handle attached to one of said jaws and extending substantially perpendicularly thereto, a generally U-shaped unit pivotally mounted directly on one of said jaws and comprising a flexible load bar, a reference bar and a spacing member connecting said two bars at one end whereas the other end of each of said two bars is free, said indenter being carried by that end of said load bar which is connected by said spacing member to said reference bar, a rotatable screw means having a knob at one end and extending lengthwise through said handle so as to bear, when operated by said knob, upon said load bar and move the free end thereof relative to the free end of said reference bar while said indenter bears against said object to be tested, means for determining the load applied to the indenter by measuring the deflection of a point of said load bar relative to the reference bar, an indicating instrument mounted on said reference bar and comprising an actuating member, and a biased lever fulcrumed on said reference bar having its one end in operative connection with said actuating member of said indicating instrument and its other end in operative connection with at least a pair of feelers adapted to bear on the surface of the object to be tested at either side of said indenter while said indenter penetrates below said surface of said object in consequence of the application of load to the free end of said load bar.

References Cited in the file of this patent

UNITED STATES PATENTS

| 293,058 | Moore | Feb. 5, 1884 |
| 2,382,289 | Burt | Aug. 14, 1945 |
| 2,448,645 | Williams | Sept. 7, 1948 |

FOREIGN PATENTS

| 613,787 | Germany | May 24, 1935 |
| 618,604 | Germany | Sept. 12, 1935 |